United States Patent [19]

Torigai

[11] Patent Number: 4,760,704
[45] Date of Patent: Aug. 2, 1988

[54] MULTI-CYLINDER ENGINE WITH TURBOCHARGER

[75] Inventor: Katsumi Torigai, Hamamatsu, Japan

[73] Assignee: Sanshin Kogyo Kabushiki Kaisha, Hamamatsu, Japan

[21] Appl. No.: 870,614

[22] Filed: Jun. 4, 1986

[30] Foreign Application Priority Data

Jun. 4, 1985 [JP] Japan ............................ 60-199827

[51] Int. Cl.$^4$ ............................................. F02B 37/00
[52] U.S. Cl. ..................................................... 60/612
[58] Field of Search .................................. 60/605, 612

[56] References Cited

U.S. PATENT DOCUMENTS

| 2,113,077 | 4/1938 | Buchi | 60/612 |
| 2,571,256 | 10/1951 | King | 60/599 X |
| 3,520,270 | 7/1970 | Miller | 60/314 X |
| 3,734,074 | 5/1973 | Butler et al. | 60/612 X |
| 4,400,945 | 8/1983 | Deutschmann et al. | 60/612 |
| 4,464,902 | 8/1984 | Mendle et al. | 60/612 |

FOREIGN PATENT DOCUMENTS 786879  6/1935  France .................... 60/612

Primary Examiner—Michael Koczo
Attorney, Agent, or Firm—Ernest A. Beutler

[57] ABSTRACT

A number of embodiments of two-cycle, turbo-charged internal combustion engines having an improved arrangement for locating the inlet of the turbine stage so as to minimize the necessity for backflow in the exhaust conduit. A number of embodiments are illustrated for applying this principle to outboard motors and in many of these embodiments, twin turbo-chargers are employed. The turbo-chargers are disposed in such a relationship so as to permit a compact relationship and to avoid close proximity between the exhaust conduits and the compressor stages.

19 Claims, 9 Drawing Sheets

MULTI-CYLINDER ENGINE WITH TURBOCHARGER

BACKGROUND OF THE INVENTION

This invention relates to a multi-cylinder engine with a turbo-charger and more particularly to an improved turbo-charger arrangement for a multi-cylinder engine, particularly of the two-cycle type, as adapted to be embodied in an outboard motor.

The use of turbo-chargers as a method for increasing the power output of internal combustion engines is well known. Turbo-chargers are frequently used, for example, in connection with two-cycle, crankcase compression internal combustion engines so as to improve the scavenging and to increase the specific output of the engine. When a multi-cylinder engine is turbo-charged, it has been the practice to provide the turbine stage inlet to the exhaust conduit at a point that is only just slightly downstream of the place where the forwardmost exhaust port discharges into this conduit. This means that the exhaust gases from the remaining cylinders must flow in a reverse direction through the exhaust conduit in order to enter the turbine stage inlet. FIG. 1 of the drawings is an illustration of the prior art type of construction and depicts the conventional type of system.

Referring specifically to FIG. 1, a multi-cylinder, turbo-charged internal combustion engine constructed in accordance with the prior art is identified generally by the reference numeral 11 and is shown schematically. The engine 11 may operate on the two-stroke, crankcase compression principle. The engine 11 is of the multiple cylinder type and has at least certain of its cylinders in an aligned relationship. Such cylinders are depicted at 12, 13 and 14. The cylinders 12, 13 and 14 have respective exhaust ports that discharge their exhaust gases into pipes 15, 16 and 17 which curve in a rearward direction of the engine and which merge into a common collector exhaust conduit 18.

The engine 11 is also provided with a turbo-charger, indicated generally by the reference numeral 19 which includes a compressive stage 21 having an air inlet 22 and a compressed air outlet 23. The compressor stage 21 is driven by an exhaust turbine stage 24 which has an exhaust inlet 25 and an exhaust outlet 26.

With the conventional prior art type of engine, the exhaust gas inlet 25 of the turbine stage 24 communicates with the exhaust pipe 18 immediately downwardly of the point where the exhaust pipe 15 of the first cylinder 12 communicates with the exhaust conduit 18. That is, the turbine stage inlet 25 communicates with the exhaust conduit 18 upstream of the point where the cylinder exhaust pipes 16 and 17 communicate with it. Therefore, the exhaust gases must flow in a reverse direction through the exhaust pipe 18 as shown in FIG. 1 in order to enter the turbine stage inlet 25. Thus, the conventional type of engine does not provide the maximum amount of driving force for the turbine stage of the turbo-charger.

It is, therefore, a principal object of this invention to provide an improved driving arrangement for the turbo-charger of a turbo-charged engine.

It is a further object of this invention to provide an improved arrangement for communicating the exhaust gases of a multiple cylinder engine with the exhaust gas inlet of the turbine stage of a turbo-charger.

In addition to the problem of providing an appropriate and effective exhaust gas inlet for the turbine stage of a turbo-charger, the design of turbo-charged engines presents a number of difficulties with respect to the location of various components. For example, it is desirable to provide the compressor stage at a close location to its driving turbine stage. However, the heated exhaust gases of the turbine stage, if they are permitted to heat the compressor stage, can decrease the volumetric efficiency of the turbo-charger and reduce the maximum power output of the engine.

Also, it is well known that turbo-charged engines have throttle lag. That is, when the operator opens the throttle valve, there is a delay before the boost comes on due to the inertia of the turbo-charger and the fact that the exhaust gases do not accelerate the turbine stage as fast as the throttle has been opened. One well known method of reducing the amount of such throttle lag is to use multiple turbo-chargers. However, the use of multiple turbo-chargers further complicates the problem of locating all of the components and still maintaining a compact overall arrangement.

One large volume application for two-cycle internal combustion engines is in outboard motors. In such outboard motors, there is also a desire to increase the performance of the outboard motor and turbo-charging offers such an alternative. However, the space problems aforenoted are even more acute in an outboard motor due to its very compact nature. Also, the problem of heat transfer between the turbine stages and the compressor stages, particularly when multiple turbo-charges are employed, is even more acute in an outboard motor than in other applications.

It is, therefore, a further object of this invention to provide a compact and highly effective multiple turbo-charging arrangement for a multiple cylinder internal combustion engine.

It is a further object of this invention to provide an improved arrangement for turbo-charging an outboard motor.

It is a yet further object of this invention to provide an improved and compact arrangement for providing multiple turbo-chargers for an internal combustion engine.

SUMMARY OF THE INVENTION

A first feature of this invention is adapted to be embodied in an internal combustion engine that has a plurality of exhaust ports and an exhaust conduit into which the exhaust ports discharge and which exhaust conduit has an outlet end. A turbo-charger is provided for the engine and the turbo-charger has a turbine stage with an inlet and an outlet. Means communicate the turbine inlet with the exhaust conduit downstream of the communication of one of the exhaust ports with the exhaust conduit.

Other features of the invention are adapted to be embodied in a turbo-charger arrangement for an internal combustion engine that comprises a first bank of cylinders having a plurality of exhaust ports that discharge into a first exhaust conduit. A second bank of cylinders is also provided that has a plurality of exhaust ports that discharge into a second exhaust conduit. The first and second exhaust conduits are disposed in parallel, side-by-side relationship. A first turbo-charger has a turbine stage having an exhaust inlet that communicates with one of the exhaust conduits and a second turbo-charger is provided that has a turbine stage having an exhaust inlet communicating with the other of the exhaust conduits.

In accordance with one of these other features of the invention, the turbine inlets communicate with the respective exhaust conduits at different axial locations.

In accordance with another of these features, each of the turbo-charges has its turbine stage juxtaposed to the respective of the exhaust conduits and each of the turbo-chargers has a compressor stage that is positioned transversely outwardly of the area between the exhaust conduit.

In accordance with yet another of these further features of the invention, the turbo-charger turbine stages each have exhaust discharges that communicate with a common exhaust pipe.

In accordance with yet a further of these other features of the invention, the turbo-charger turbine stages have their exhaust discharge located on one side of the engine and the turbo-chargers have their compressor stages located on the other side of the engine.

DETAILED DESCRIPTION OF THE PREFERRED EMBODIMENTS

Figure 1:
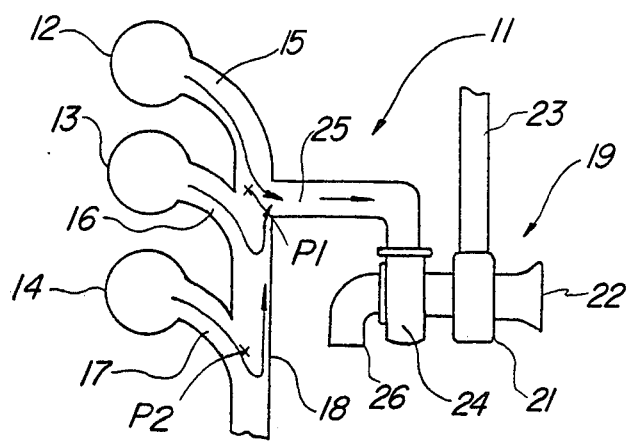
FIG. 1 is a partially schematic view of a turbo-charged multiple cylinder internal combustion engine constructed in accordance with the prior art.
Figure 2:
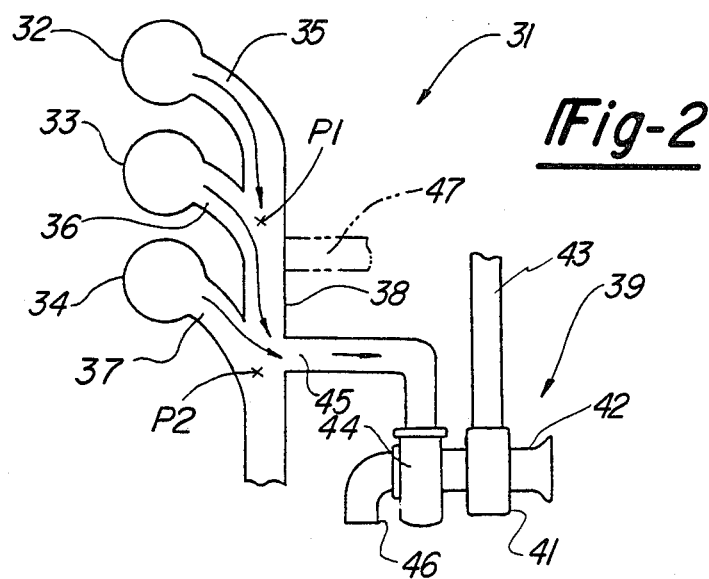
FIG. 2 is a partially schematic view, in part similar to FIG. 1, showing a turbo-charged internal combustion engine constructed in accordance with an embodiment of the invention.
Figure 3:
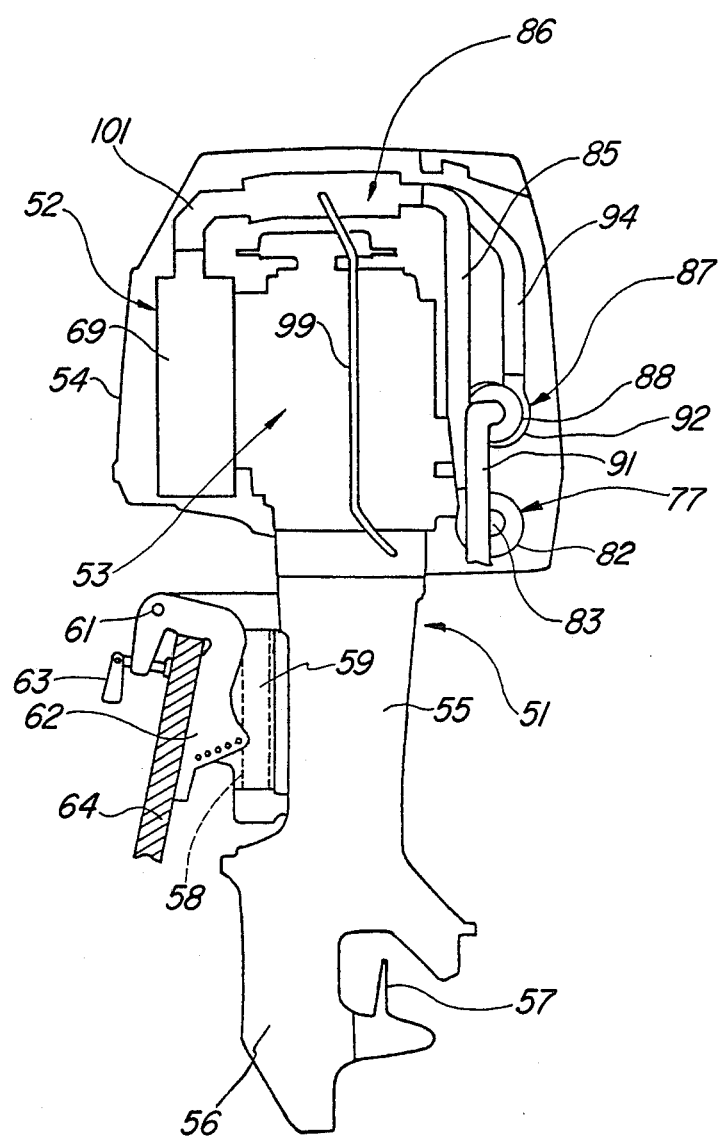
FIG. 3 is a side elevational view of an outboard motor constructed in accordance with another embodiment of the invention.

Referring first to FIG. 2, the principle of the invention as applied to a turbo-charged multiple cylinder internal combustion engine, indicated generally by the reference numeral 31, is shown schematically. The engine 31 is of the multiple cylinder, inline type and includes cylinders 32, 33 and 34, each of which has exhaust ports that feed into exhaust pipes 35, 36 and 37, respectively. The exhaust pipes 35, 36 and 37 merge into a common exhaust conduit 38.

The engine 31 also includes a turbo-charger, indicated generally by the reference numeral 39, and which includes a compressor stage 41 having an air inlet 42 and a discharge 43 that communicates with the induction system of the engine in a known manner.

The compressor stage 41 is driven by a turbine stage 44 that includes an exhaust gas inlet 45 that communicates with the exhaust conduit 38 at a location to be described, and an exhaust gas discharge 46.

Unlike the prior art type of constructions, the turbine stage exhaust gas inlet 45 communicates with the exhaust conduit 38 at a point P2 that is downstream of the point where each of the exhaust pipes 35, 36 and 37 communicate with the exhaust conduit 38. Alternatively, an upstream location may be employed, as shown in phantom at 47, which is downstream of a point P1 wherein the first and second exhaust pipes 35 and 36 communicate with the exhaust conduit 38. In this way, there will be a minimum of necessity for exhaust gases to back flow through the exhaust conduit 38 to enter the turbine stage inlet 45 and significantly improved performance will result.

Referring now to FIG. 3 through 6, an outboard motor constructed in accordance with a principle of the invention including the arrangement shown in FIG. 2, is identified generally by the reference numeral 51.

The outboard motor 51 includes a power head assembly, indicated generally by the reference numeral 52 and including an internal combustion engine, indicated generally by the reference numeral 53, and a surrounding protective cowling 54. As is typical with outboard motor practice, the engine 53 is disposed so that its output shaft (not shown) rotates about a vertically extending axis and drives a drive shaft (not shown) that is journaled within a drive shaft housing 55 positioned at the lower end of the power head 52. This drive shaft extends into a lower unit 56 in which a forward, neutral, reverse transmission of a known type is contained for driving a propeller 57 in selected forward or reverse directions.

The outboard motor 51 further includes a steering shaft 58 that is fixed to the drive shaft housing 55 and which is journaled for steering movement within a swivel bracket 59. The swivel bracket 59 is, in turn, pivotally connected by a horizontally extending tilt pin 61 to a clamping bracket 62. The clamping bracket 62 carries a clamping device 63 for affixing the outboard motor 51 to a transom 64 of an associated watercraft. The construction of the outboard motor as thus far described may be considered to be conventional and, for that reason, details of the outboard motor which are not critical to the invention have not been illustrated and will not be described in any more detail.

The engine 53 is, in the illustrated embodiment, of the V type having opposed banks of cylinders which are defined by a cylinder block 65. Respective cylinder heads 66 are affixed to the cylinder banks and form the combustion chambers, as is well known in this art. The engine 51 operates upon the two-stroke, crankcase compression principle. To this end, the individual crankcase chambers are sealed from each other and an induction system comprising an intake manifold 67 is provided for delivering a fuel/air charge to these individual crankcase chambers. This induction system further includes a plurality of vertically spaced carburetors 68 that draw an air charge from a plenum chamber, air silencing device 69. In the engine as will be described, the plenum chamber 69 is provided with a source of pressurized air.

Each bank of cylinders is provided with respective, vertically spaced exhaust ports 71, 72 and 73. The exhaust ports 71, 72 and 73 associated with one cylinder bank all communicate with a vertically extending exhaust passage 74 in the manner as illustrated in FIG. 2. In a similar manner, the exhaust ports 71, 72 and 73 of the other cylinder bank communicate with a vertically extending exhaust passage 75 which extends parallel to and in spaced side-by-side relationship with the exhaust passage 74. The exhaust passages 74 and 75 open through an outer face of the cylinder block 53 and are closed by means of an exhaust cover plate 76.

A first turbo-charger, indicated generally by the reference numeral 77 is associated with the exhaust passage 74 for boosting the inlet charge delivered to the engine, in a manner as will described. The turbo charger 77 has a turbine stage 78 that has an exhaust gas inlet opening 79 that communicates with the exhaust passage 74 at a point downstream of a point P2, which is located below the points where the exhaust ports 71, 72 and 73 enter the exhaust passage 74. The exhaust gases are discharged from the turbine 78 through an exhaust discharge pipe 81.

Figure 4:
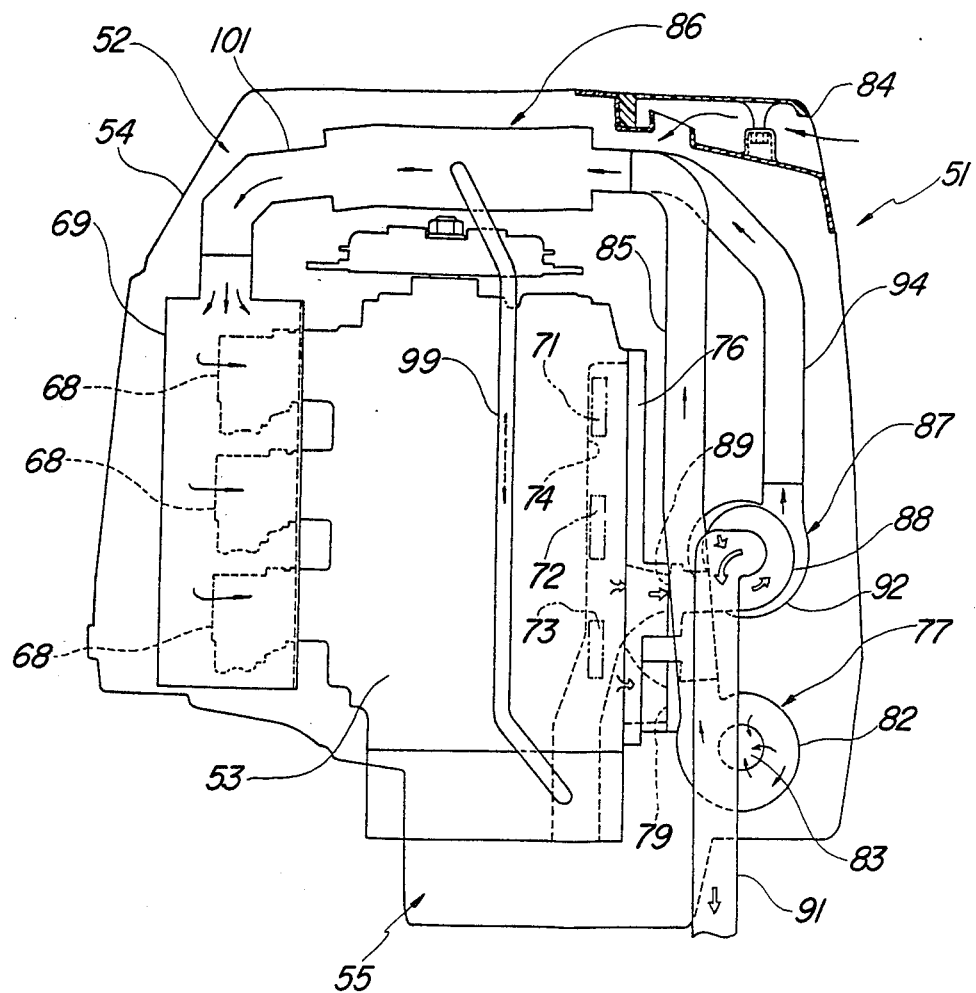
FIG. 4 is an enlarged side elevational view, with portions broken away, of the power head of this other embodiment.
Figure 5:
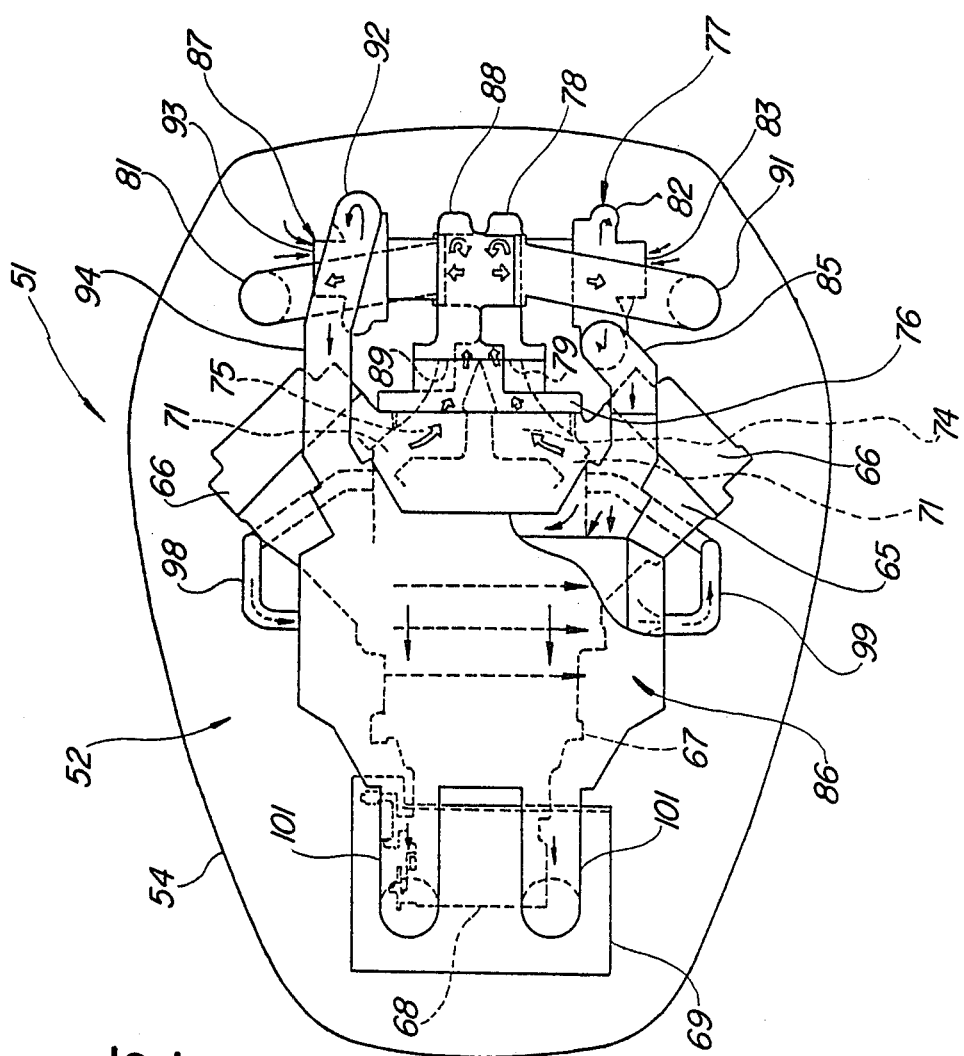
FIG. 5 is an enlarged top plan view of the power head of this embodiment.
Figure 6:
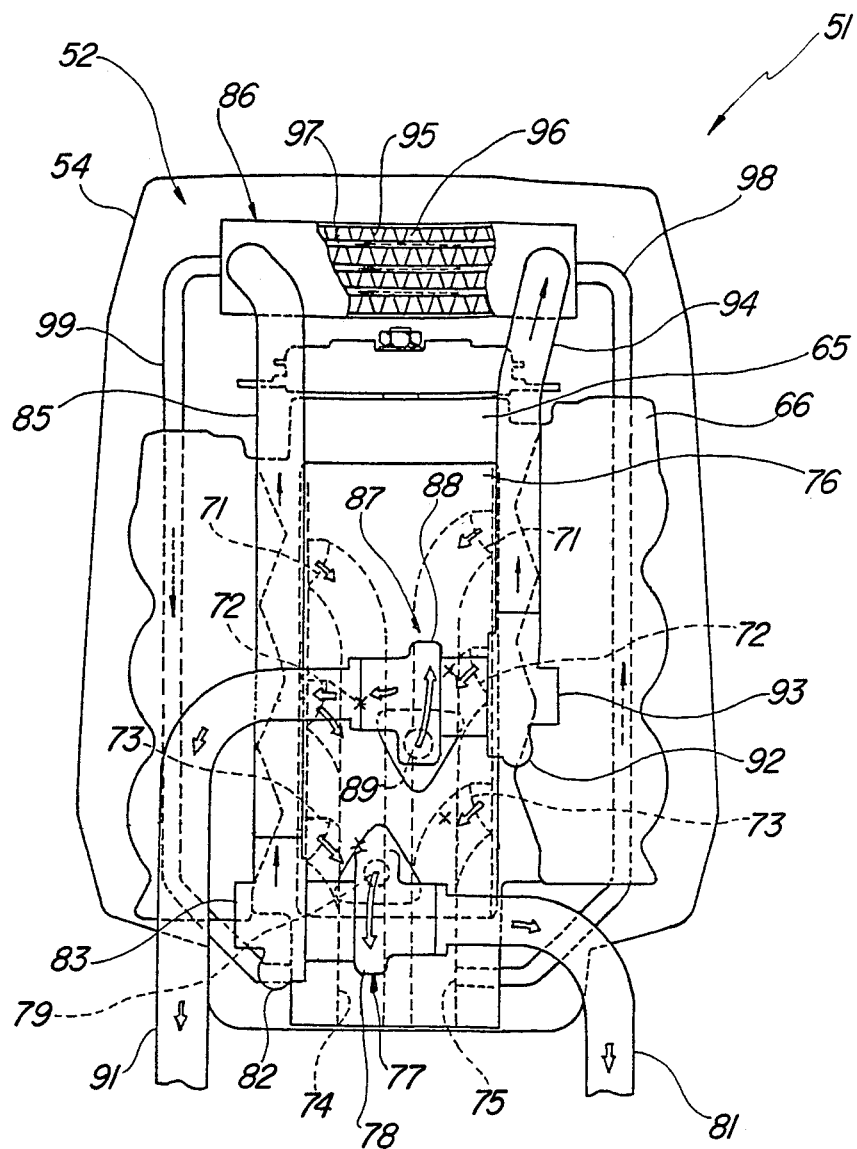
FIG. 6 is an enlarged rear elevational view of the power head of this embodiment.

The turbo-charger 77 further includes a compressor stage 82 that draws atmospheric air through an air inlet 83. The inlet 83 is in communication with the interior of the protective cowling 54 and air is delivered to this interior through an air inlet opening formed in the cowling and identified by the reference numeral 84 (FIG. 4). The compressor stage 82 discharges the compressed air through a conduit 85 to an intercooler device, indicated generally by the reference numeral 86, and which will be described later in more detail.

The engine 52 is provided with a further turbo-charger, indicated generally by the reference numeral 87. The turbo-charger 87 has a turbine stage 88 which has an inlet opening 89 that communicates with the exhaust passage 75. It should be noted that the opening 89 is axially spaced from the inlet opening 79 of the turbo-charger turbine stage 78 so that the turbo-chargers are staggered with respect to each other. This facilitates the positioning of the turbo-chargers in the relatively compact area of the protective cowling 54 while at the same time permitting them both to be driven effectively from the exhaust gases. It should be noted that the opening 89 is positioned downstream of the point P1 so that at least two of the exhaust ports 71 and 72 are upstream of it. The turbine stage 88 of the turbo-charger 87 discharges through an exhaust pipe 91, which is disposed on the opposite side of the engine from the exhaust pipe 81.

The turbo-charger 87 is also provided with a compressor section 92 that has an inlet opening 93 which draws air from the interior of the protective cowling 54. Air under pressure is discharged from the compressor stage 92 through a pressure air delivery line 94 which, in turn, delivers the air to the intercooler 86 on the side of the engine opposite to the turbo-charger outlet conduit 85.

It should be noted that the turbo-charger turbine stages 82 and 92 are positioned laterally outwardly of the exhaust passages 74 and 75 and hence will be in a cooler area even though the engine is extremely compact. Hence, there will be little loss in volumetric efficiency due to heating of the intake charge.

The output of the engine 51 is further increased due to the use of the intercooler 86. It should be noted that the intercooler 86 is provided with a plurality of internal fins 95 that define transversely extending air passages 96 through which the pressurized air may flow from the exhaust side of the engine 51 to the intake side. Tubes 97 extend between the passages 96 and receive coolant from the engine cooling system through a coolant delivery conduit 98. The coolant that has been utilized to cool the intake charge is returned to the engine cooling system through a coolant return passage 99. The flow of coolant is transverse to the direction of air flow as may be seen in FIG. 5. In this way, very effective intercooling is achieved that will, as has been noted, act to provide a greater volumetric efficiency for the engine and, accordingly, a greater specific output.

From the intercooler 89, air is delivered to the silencing device 69 through a pair of air delivery conduits 101. The conduits 101 extend on opposite sides of the engine and act to pressurize the air within the intake device 69.

Figure 7:
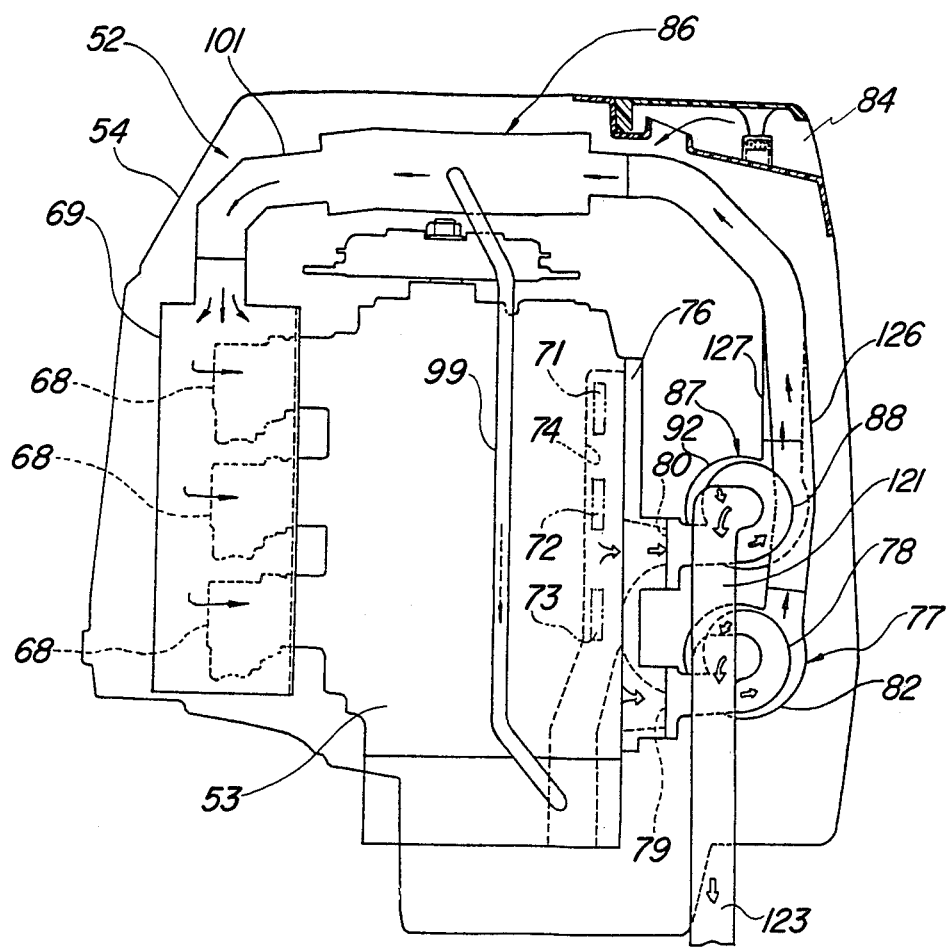
FIG. 7 is an enlarged side elevational view of the power head of an outboard motor constructed in accordance with yet another embodiment of the invention.
Figure 8:
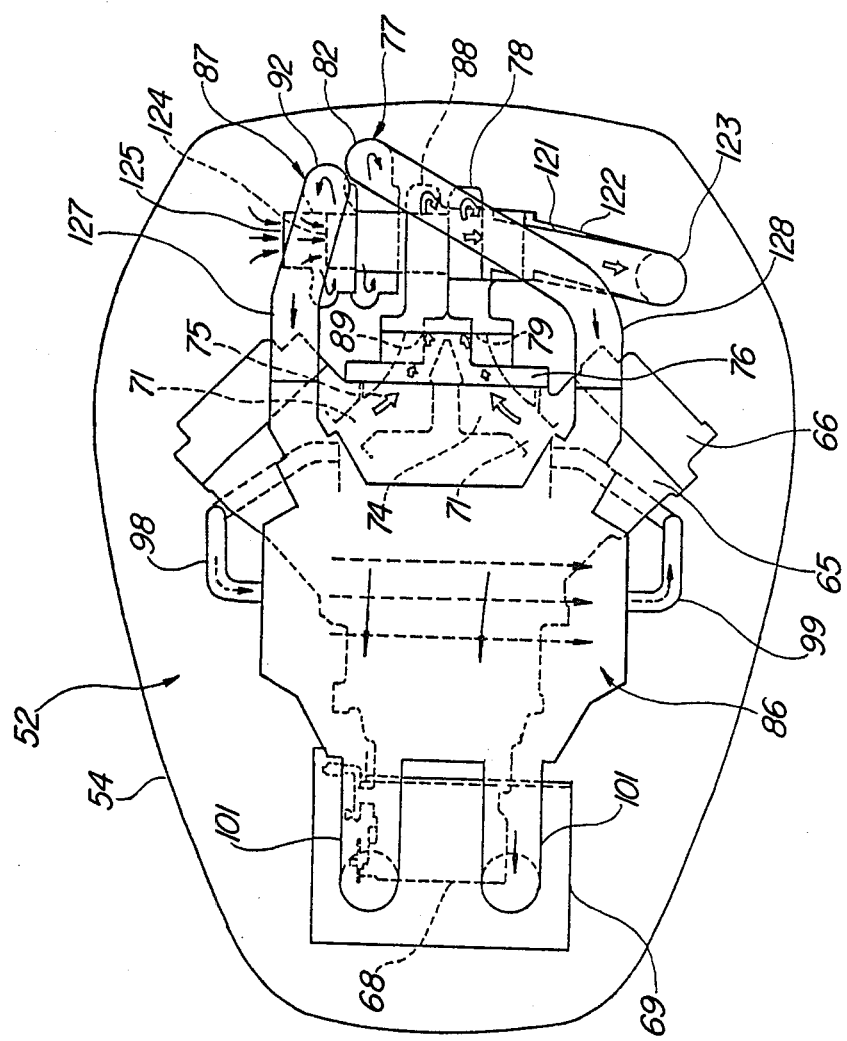
FIG. 8 is an enlarged top plan view of the embodiment of FIG. 7.
Figure 9:
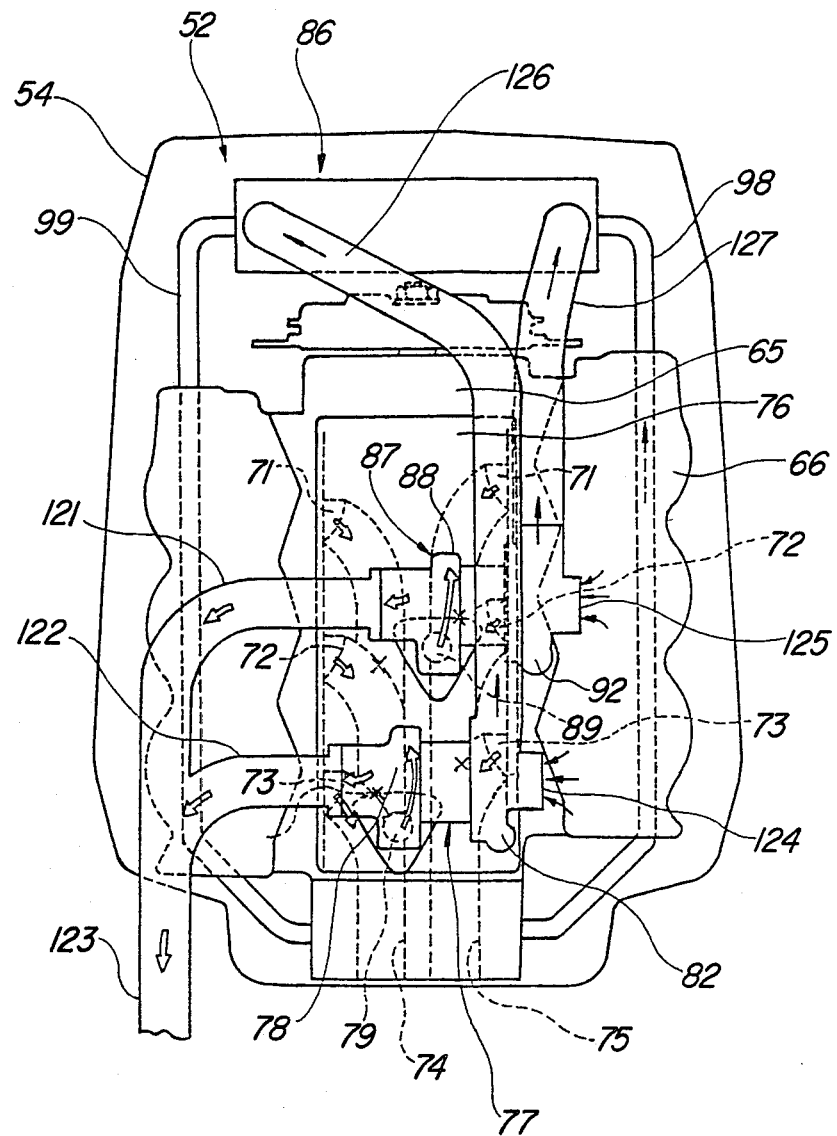
FIG. 9 is an enlarged rear elevational view of the embodiment of FIGS. 7 and 8.

Referring now to the embodiment of FIGS. 7 through 9, the basic construction of the outboard motor and the basic components of the engine are the same as the previously described embodiment. This embodiment differs from the previously described embodiment only in the location of the compressor sections of the turbo-chargers relative to their turbine sections and in the manner in which the intake air charge is introduced and delivered to the intercooler and in the way that the exhaust gases are discharged from the turbine stages of the turbo-charger. For that reason, those components which are the same as the previously described embodiment have been identified by the same reference numerals and they will not be described again, except insofar as is necessary to understand the construction and operation of this embodiment.

In this embodiment, the turbo-chargers 77 and 87 have their turbine stages 78 and 88 in the same relationship with the exhaust passages 74 and 75 as in the previously described embodiment. That is, the turbine stage exhaust inlet opening 79 communicates with the exhaust passage 74 and the turbine stage inlet passage 89 communicates with the exhaust passage 75 and these inlet openings are axially spaced from each other. In this embodiment, however, the outlet of the turbine stage 88 communicates with an exhaust outlet pipe 121 and the outlet of the turbine stage 78 communicates with an exhaust outlet pipe 122. The exhaust outlet pipes 121 and 122 extend generally parallel to each other and extend to the same side of the engine wherein they merge into an exhaust discharge pipe 123. Hence, in this embodiment, the exhaust from the turbine stages of the two turbines lies on the same side of the engine and through a common pipe.

In this embodiment, the compressor stages 82 and 92 are also disposed outwardly of the exhaust passages 74 and 75 but unlike the embodiment of FIGS. 3 through 6, these compressors are positioned on the same side of the engine. That is, the compressor stage 82 has an inlet opening 124 and the compressor stage 92 has an inlet opening 125 and both the inlet openings 124 and 125 extend on the same side of the engine and on the side opposite from the exhaust discharge pipe 123. In this way, the turbine stages and compressor stages are more widely separated from each other and none of the exhaust pipes from the turbine stages cross over or are in proximity to either the inlets or outlets from the compressor stages.

In a similar manner, the compressor stage 82 discharges through a pipe 126 at this side of the engine vertically upwardly and then branches to the other side of the engine wherein it discharges into the intercooler 86. The compressor stage 92 discharges through a discharge pipe 127 that is juxtaposed to the pipe 126 through a portion of its length and which lies on the same side of the engine. The pipe 127 discharges into the opposite side of the intercooler 86 as clearly may be seen from FIGS. 8 and 9.

Except for the differences as aforenoted, the embodiment of FIGS. 7 through 9 operates as in the same manner as the previously described embodiment and, for that reason, a further discussion and description of this embodiment is believed to be unnecessary.

Figure 10:
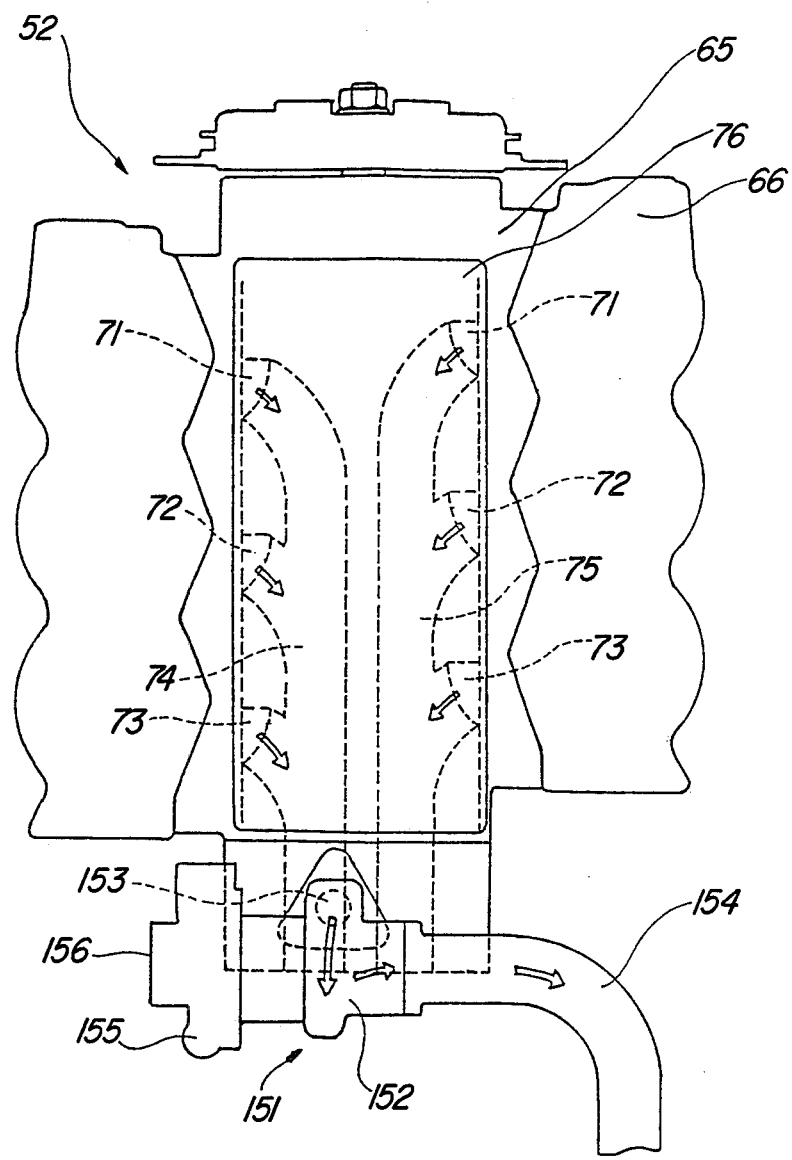
FIG. 10 is an enlarged rear elevational view of the power head of an outboard motor constructed in accordance with a still further object of the invention.

FIG. 10 illustrates a still further embodiment of the invention. The basic construction of the engine and its exhaust porting and exhaust system is the same as the two embodiments already described in detail and, therefore, these components have been identified by the same reference numerals and will not be described again, except insofar as is necessary to understand the relationship of this embodiment to the preceding embodiments.

Unlike the previously described embodiments, this embodiment employs only a single turbo-charger, indicated generally by the reference numeral 151. Because of the use of only a single turbo-charger, this embodiment may experience some more throttle lag than the preceding embodiments that employed two smaller diameter turbo-chargers. However, the use of the single turbo-charger provides a more compact and simpler arrangement and thus may, in some instances, lend itself to greater applicability to an outboard motor.

The turbo-charger 151 includes a turbine stage 152 that has an inlet opening for exhaust gases 153 that communicates with the exhaust passage 74 at a point downstream of the points P1 and P2. It is to be understood, however, that the opening 153 may communicate with the exhaust passage 75 at such a location or, alternatively, may communicate with a point where the passages 74 and 75 merge with each other. The exhaust gases from the turbine stage 152 are discharged to the atmosphere through an exhaust discharge pipe 154.

The turbo-charger 151 further includes a compressor stage 155 that is disposed outwardly of the exhaust passages 74 and 75 and on the opposite side of the turbine stage 152 from the exhaust pipe 154 so as to prevent unnecessary heating of it. The compressor stage 155 has an inlet opening 156 for drawing air from within the area confined by the protective cowling (not shown) as in the preceding embodiments. The outlet from the compressor stage 155 is not shown but may communicate in any suitable manner with a intercooler (not shown) or with the induction system of the engine.

It is believed clear from the foregoing description that a number of embodiments of the invention have been illustrated and described, each of which provides a very compact arrangement and which also insures that there will be a good supply of exhaust gases to drive the turbine stage or stages of the turbo-chargers without requiring reverse flow through the exhaust conduit. In addition, dual turbo-charger arrangements have been illustrated and described that are compact enough to permit their use in conjunction with outboard motors and yet which will provide good volumetric efficiency. Although a number of embodiments of the invention have been illustrated and described, various changes and modifications may be made without departing from the spirit and scope of the invention, as defined by the appended claims.

What is claimed is:

1. In a turbo-charger for an internal combustion engine comprising a first bank of cylinders having a plurality of exhaust ports all discharging into a first exhaust conduit, a second bank of cylinders not in line with said first bank of cylinders having a plurality of exhaust ports all discharging into a second exhaust conduit, said first and said second exhaust conduits being disposed in parallel, side-by-side relationship, a first turbo-charger having a turbine stage having an exhaust inlet communicating with one of said exhaust conduits, and a second turbo-charger having a turbine stage having an exhaust inlet communicating with the other of said exhaust conduits, said turbine exhaust inlets communicating with the respective exhaust conduits at different downstream locations along the length of the respective exhaust conduits.

2. In a turbo-charger as set forth in claim 1 wherein each of the turbine exhaust inlets communicate with the respective exhaust conduits downstream of the communication of at least two of the exhaust ports of the respective bank with the respective exhaust conduit.

3. In a turbo-charger as set forth in claim 2 wherein each of the turbo-chargers has its compressor stage disposed transversely outwardly of the area between the exhaust conduits.

4. In a turbo-charger as set forth in claim 3 wherein the compressor stages of the turbo-chargers are located on opposite sides of the exhaust conduits.

5. In a turbo-charger as set forth in claim 3 wherein the turbo-charger compressor stages are located on the same side of the exhaust conduits.

6. In a turbo-charger as set forth in claim 5 wherein the exhaust outlets of turbine stages of the turbo-chargers merge into a common exhaust pipe.

7. In a turbo-charger as set forth in claim 6 in combination with a marine propulsion unit wherein the engine drives the marine propulsion unit and the engine and turbo-chargers are encircled by a protective cowling.

8. In a turbo-charger as set forth in claim 1 wherein the banks of cylinders are disposed at an angle to each other and the exhaust conduits extend through the area between the banks of cylinders.

9. In a turbo-charger as set forth in claim 8 in combination with a marine propulsion unit wherein the engine drives the marine propulsion unit and the engine and turbo-chargers are encircled by a protective cowling.

10. In a turbo-charger arrangement for an internal combustion engine comprising a first bank of cylinders having a plurality of exhaust ports all discharging into a first exhaust conduit, a second bank of cylinders not in line with said first bank of cylinders and having a plurality of exhaust ports, all discharging into a second exhaust conduit, said first and said second exhaust conduits being disposed in parallel, side-by-side relationship, a first turbo-charger having a turbine stage having an exhaust inlet communicating with one of said exhaust conduits, and a second turbo-charger having a turbine stage having an exhaust inlet communicating with the other of said exhaust conduits, each of said turbo-chargers having its turbine stage juxtaposed to the respective of said exhaust conduit, each of said turbo-chargers having its compressor stage positioned transversely outwardly of the area between said exhaust conduits.

11. In a turbo-charger arrangement as set forth in claim 10 wherein the compressor stages of the turbo-chargers are located on opposite sides of the exhaust conduits.

12. In a turbo-charger arrangement as set forth in claim 10 wherein the turbo-charger compressor stages are located on the same side of the exhaust conduits.

13. In a turbo-charger arrangement as set forth in claim 12 wherein the exhaust outlets of the turbine stages of the turbo-chargers merge into a common exhaust pipe.

14. In a turbo-charger arrangement as set forth in claim 10 in combination with a marine propulsion unit wherein the engine drives the a marine propulsion unit and the engine and turbo-chargers are encircled by a protective cowling.

15. In a turbo-charger arrangement as set forth in claim 14 wherein the compressor stages of the turbo-chargers are located on opposite sides of the exhaust conduits.

16. In a turbo-charger arrangement as set forth in claim 14 wherein the turbo-charger compressor stages are located on the same side of the exhaust conduits.

17. In a turbo-charger arrangement as set forth in claim 16 wherein the exhaust outlets of the turbine stages of the turbo-chargers merge into a common exhaust pipe.

18. In a turbo-charger arrangement for an internal combustion engine comprising a first bank of cylinders having a plurality of exhaust ports all discharging into a first exhaust conduit, a second bank of cylinders not in line with said first bank of cylinders and having a plurality of exhaust ports all discharging into a second exhaust conduit, a first turbo-charger having a turbine stage having an exhaust inlet communicating with one of said exhaust conduits, and a second turbo-charger having a turbine stage having an exhaust inlet communicating with the other of said exhaust conduits, said turbo-charger turbine stages having their exhaust discharge on the same side of said engine, said turbo-chargers having their compressor stage located on a side of said engine other than said same side.

19. In a turbo-charger as set forth in claim 18 in combination with a marine propulsion unit wherein the engine drives the marine propulsion unit and the engine and turbo-chargers are encircled by a protective cowling.

* * * * *